United States Patent Office 3,452,870
Patented July 1, 1969

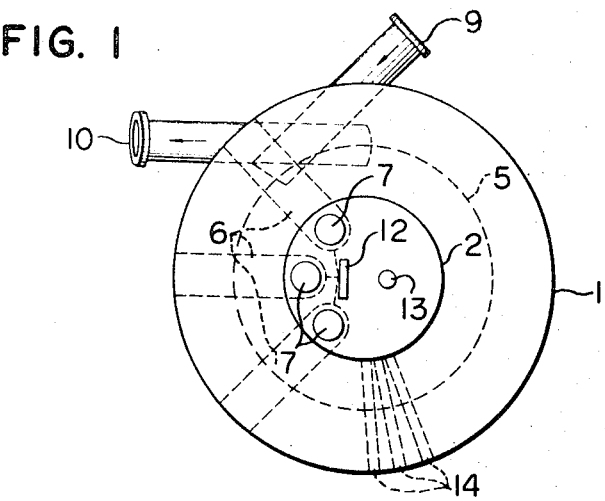
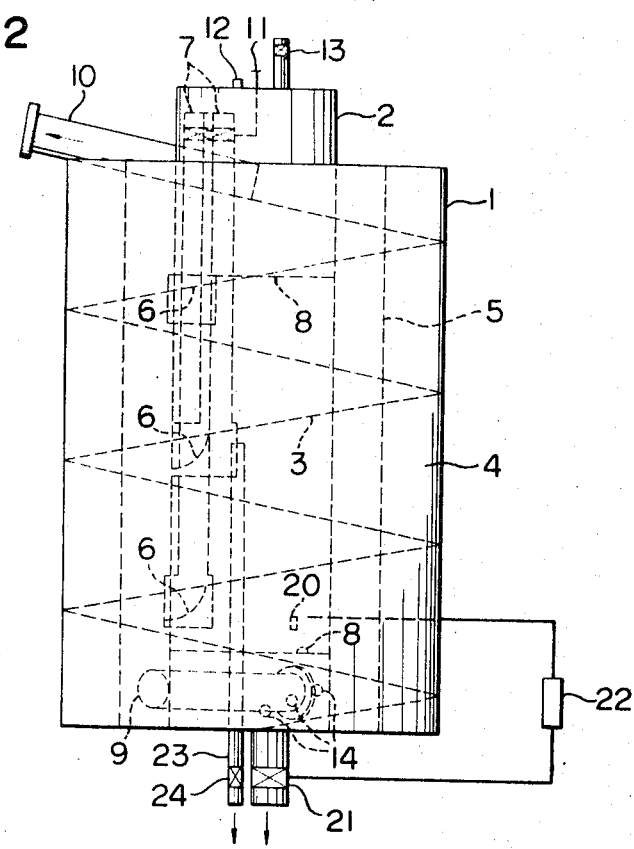

3,452,870
APPARATUS FOR SEPARATING FLUIDS BY CENTRIFUGAL AND GRAVITATIONAL FORCES
Kihei Katsuta, Yoshikatsu Shimasaki, and Ikuo Miki, Nagasaki-shi, Japan, assignors to Mitsubishi Jukogyo Kabushiki Kaisha, Tokyo, Japan
Filed Dec. 3, 1965, Ser. No. 511,417
Claims priority, application Japan, Dec. 7, 1964, 39/68,719
Int. Cl. B01d 17/02
U.S. Cl. 210—94
14 Claims

ABSTRACT OF THE DISCLOSURE

A device for separating liquids, insoluble with respect to each other, by controlling the flow of the liquid to utilize both centrifugal and gravitational forces. The device further utilizes aeration and controlled flow to improve the separation by specific gravity.

---

This invention relates in general to separating devices and in particular to a new and useful apparatus for separating liquids of different specific gravity which are insoluble in respect to each other in a continuous large volume and effective operation.

Liquid mixtures commonly encountered include oily water. Usually, oily water discharged from marine vessels and plants on the land contains heavy oil, crude oil, lubricating oil, or the like, in concentrations ranging from about 0.1 to 25%. It is not only wasteful to discharge oils in such large amounts but also against the international agreements for prevention of port water pollution according to which discharge of oily water from plants and marine vessels is banned unless the oil content is 100 mg. or less per liter of water. Thus, with the development of industry, there is a growing demand for high-efficiency apparatus for separting liquid mixtures, from the viewpoint of environment sanitation as well as of industrial economy.

For the above purpose, many different apparatuses have hitherto been proposed, but none of them is adapted for separation of liquid mixtures in sufficiently large quantities with a high efficiency.

The present invention has for its principal object provision of a novel, highly efficient separating apparatus for liquid mixtures which is free from the disadvantage of the conventional apparatus and which is capable of treating large quantities of mixtures, particularly of oil and water.

More particularly, the invention provides an apparatus capable of treating large quantities of liquid mixtures with a great efficiency, which is characterized by the following construction. This apparatus comprises an outer cylinder and an inner cylinder defining a separating chamber therebetween provided with a long vertical passage along which a liquid mixture is permitted to whirl upward. The inner cylinder is provided midway with some openings, each of which is equipped with a separating weir curved against the flow direction, so that the portion of the liquid mixture flowing close to the inner cylinder through the vertical passage, can be constantly caught and led into the inner cylinder which serves as a settling tank, whereby the interior of the separating chamber is loaded uniformly. To promote the separating effect in the vertical passage, several flow-regulating plates are provided at certain regular intervals inside the passage, generally in parallel to the side walls that define the passage. Further, to enhance the effect of separating a liquid mixture, insoluble gas is introduced in the form of minute bubbles into the separating chamber through inlet ports thereof, and is allowed to float up entraining the liquid component to be separated out.

Accordingly, it is an object of the invention to provide a separating device particularly for separating oil and water which is capable of high speed operation for effectively and continuously separating two liquids of different specific gravity.

A further object of the invention is to provide a separating device for liquids of different specific gravity such as oil and water which includes an outer container having an inner container extending upwardly therethrough and with a spiral path for the mixture of the liquids defined upwardly in the space between the inner and outer containers from the bottom, and with baffle means along the height of the inner container for deflecting the lighter liquid into the central container for collection and removal from the heavier liquid which is collected at the top.

A still further object of the invention is to provide a separating device which is simple in design, rugged in construction and economical to manufacture.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there are illustrated and described preferred embodiments of the invention.

In the drawings:

FIG. 1 is a plan view of the apparatus embodying the invention;

FIG. 2 is a front elevation of the apparatus;

Figure 3:
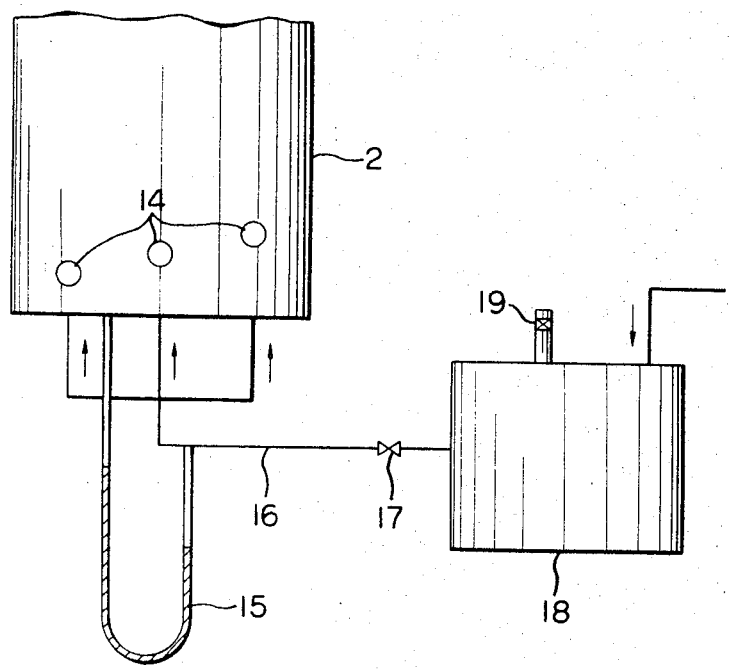
FIG. 3 is a schematic view of an insoluble gas blowing-in system.

Referring to the drawings, an outer cylinder 1 incorporates an inner cylinder 2, defining a separating chamber therebetween. In the chamber, a vertical passage 4 is formed by vertically ascending passage plates 3 which have a suitable elevation and height. Inside the vertical passage 4, a vertical flow-regulating plate 5 is provided vertically and at right angles to the vertically ascending passage plate 3, to divide the thickness of liquid layer in said vertical passage in the radial direction thereby to improve the flow-regulation and to enhance the separating effect. In the light of the general tendency that water is drawn outwardly and hence oil is drawn inwardly by the centrifugal force, the flow-regulating plate 5 is provided each with a suitable number of cut-away portions or through holes 5' on the upper part, as shown in FIG.

Figure 4:
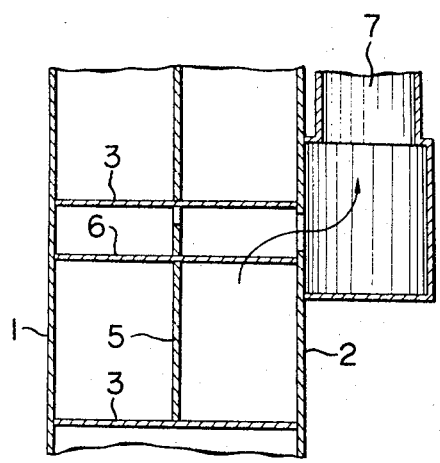
FIGS. 4 and 5 are enlarged longitudinal and peripheral sectional views, respectively, of a part of the apparatus shown in FIGS. 1 and 2.
Figure 5:
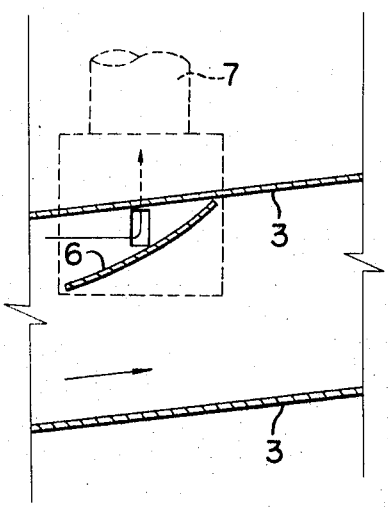
Figure 6:
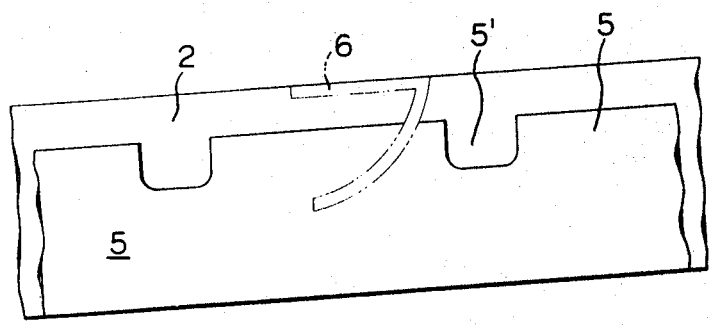
FIG. 6 is an enlarged and developed view of a flow-regulating plate.

6, so that the oily content separated in the vertical passage can be collected along the inner wall of the separating chamber. Further, the flow-regulating plate 5 is positioned to a height somewhat lower than that of the vertical passage, thereby to facilitate the collection of separated oil. As shown in FIGS. 4 and 5, the vertically ascending passage plates 3 are provided with a suitable number of separating weirs 6 curved against the flow direction like a scoop plate. The separating weirs 6 are associated with drain risers or discharge pipes 7 for constantly discharging into the inner cylinder 2 the oil content separated by the separating weirs 6 and the insoluble gas introduced to facilitate separation of the oily water. Inside the inner cylinder 2 are arranged flow-regulating plates 8 which are provided with a suitable number of through holes for precluding agitation or turbulency of separated oil that flows in through the discharge pipes 7 for the separated liquid. A duct 9 for introducing oily water or the like into the system and a drain pipe 10 are provided at the bottom and the top, respectively, of the separating chamber. The discharge pipe 7 for the separated liquid is equipped with a control valve 11 for controlling the amount of discharge. An inspection window 12 is so provided on the upper portion of the inner cylinder 2 as to permit observation of the discharging condition of the separated liquid through the discharge pipes 7. To regulate the gas pressure inside the system, an automatic regulating valve 13 is employed. A plurality of ducts 14 of porous material is laid for introduction of insoluble gas in the vicinity of the inlet port of the vertical passage of the separating chamber. The ducts 14 communicate through a mercury differential pressure gauge, a gas inlet pipe 16, and a pressure regulating valve 17 with an insoluble gas reservoir 18. A pressure regulating valve for the insoluble gas reservoir 18 is indicated at 19. A liquid level detecting terminal 20 and an electromagnetic valve 21 for draining purposes mounted on suitable positions in the inner cylinder 2 are cooperatively associated with each other by way of an automatic level control means 22 in order thereby to regulate the height of interface between the separated oil and water layers in the inner cylinder 2. Indicated at 23 is a discharge pipe for separated liquid, which has a valve 24, and extends upwardly to a suitable height somewhat above the level detecting terminal 20.

In an apparatus of the construction as above described, oily water, for example sea water containing heavy oil, is separated and purified in the following way. First, the sea water is introduced into the apparatus through the duct 9 provided exclusively for introduction of oily water. The flow of liquid is urged to whirl up while being regulated to a non-turbulent flow in the vertical passage 4. As the liquid level is increased gradually, the heavy oil of low density is separated from the sea water of high density. The greater the difference in density between the constituents of liquid mixture and the longer the residence time are, the greater the efficiency of separation. The apparatus of the invention takes advantage of this phenomenon, and combines it with application of centrifugal force to the flow, which is helpful in promoting separation of low-density oil from water. While the separation efficiency depends on the correlation between the vertical flow velocity and residence time in the separating passage, it is usual in practice to design a separating apparatus to a size which can meet a flow inside the separating passage at a standard velocity of 0.1 m./sec. or less and hence the cross sectional area of the separating passage is selected in proportion to the intended amount of liquid mixture to be disposed of. In this case, for example, the amount of liquid mixture to be separated is assumed to be 25 tons per hour. Then, the dimensions of apparatus are such that the inner cylinder is 900 mm. in diameter and 2700 mm. in height while the outer cylinder is 1,800 mm. in diameter and 2,700 mm. in height, and the separating passage is 450 mm. x 350 mm. in cross sectional area and 12,000 mm. in length. These are standard dimensions in designing the apparatus in accordance with the invention.

As the apparatus as above described permits oily water to whirl up in the chamber defined by the outer cylinder 1 and inner cylinder 2, as if the chamber were partitioned in several stages, the apparatus can have a long separating passage, and hence a long residence time and a high separating efficiency. Since separating weirs 6 are provided in several places of the vertical passage 4 for constantly discharging separated heavy oil, the separated heavy oil is guided by the separating weirs 6 into the discharge risers 7 upwardly, and is then discharged into the inner cylinder 2 from the top end of the risers. In order to minimize the amount of sea water mixed in the heavy oil in this stage, the operator must before-hand regulate the opening of the control valve 11 mounted on the discharge risers 7 while watching the discharging condition through the window 12. After the separation of heavy oil, the sea water is discharged out of the apparatus through the drain pipe 10. Meanwhile, the heavy oil separated in and discharged from the vetrical passage 4 is accumulated in the inner cylinder 2, where it is further purified and is thoroughly separated from the remnant of sea water. The separated sea water is controlled by the automatic level control means 22 to a level below the position of the level detecting terminal 20, and then is drained out of the apparatus. The purified heavy oil is discharged out of the system through the discharge pipe 23 and discharge valve 24.

In case of the level control, the automatic control means as employed above may be replaced by an arrangement, wherein two cocks are arranged at different heights on the side wall of the inner cylinder 2, said cocks being kept slightly open so that sea water flows out of the cock in the lower position and heavy oil flows out of the higher cock, and that the interface between the different fluids can be always maintained between the two cocks. In this case, if the interface is raised to such an extent that sea water flows out through the cock for heavy oil, it is only necessary to increase the opening of the cock in the lower portion of the inner cylinder 2 thereby to increase the drain amount of sea water and to lower the interface. Of course, in this case the discharge outlet for heavy oil is provided at a point sufficiently higher than the cock for extracting heavy oil.

In a case where further enhancement of separating efficiency or the oily water to be encountered is stable and difficult to be separated, blowing of insoluble gas into the system proves useful. The insoluble gas to be used for this purpose is one that has a low solubility to sea water or fresh water which constitutes the oily water to be separated and which is available in abundance. Usually air, nitrogen gas, various exhaust gases, carbonic acid gas, etc. are used.

In FIG. 3, while in insoluble gas, e.g. air, is being introduced from the outside into the gas reservoir 18, the pressure regulating valve 17 is opened and the gas is blown into the vertical passage 4. The gas pressure is regulated by the pressure regulating valve 19 in accordance with the reading of the mercury differential pressure gauge 15.

Then, the air is led through the inlet pipe 16 and slowly through the porous ducts 14 into the system. Since the surface tension of heavy oil against air is less than that of sea water, the oil tends to be entrained and carried upward by air bubbles, thus promoting the separating operation.

Figure 7:
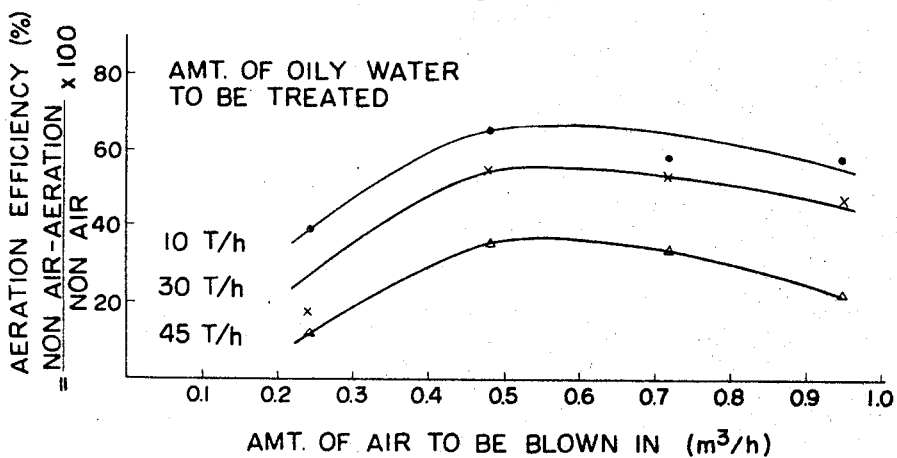
FIG. 7 is a diagram showing aeration effects.

In this case, as seen from the experimental results on the aeration effects given in FIG. 7, the maximum benefit is obtained when the blowing amount of air lies in a critically small range, between about 0.5 and $0.6^3$/hr. for the amount of oily water in the range from 10 to 45 tons/hr. If the amount of air supply is less than the above range, contact of air with oil particles will be insufficient, and if the amount is excessive, the flow of oily water will be disturbed.

The most desirable position for air blowing is in the vicinity of the inlet or separating passage because, as seen from the test results shown in Table I, in this case the most effective contact time for a limited length $l$ of the separating passage can be obtained and, even if the flow of oily water is disturbed, it tends to be steady in the course of the long contact period, and thus the flow is not susceptible to disturbance.

TABLE I

| Test No. | Gas blowing-in position | At inlet of separating passage (p.p.m.) | At outlet of separating passage (p.p.m.) |
|---|---|---|---|
| 1 | Non-air | 10,000 | 82 |
| 2 | 1 (blowing on inlet side) [1] | 10,000 | 54 |
| 3 | 1/2 (intermediate blowing) | 10,000 | 70 |

[1] l: Overall length of the separating passage.

If the gas supply arrangement is such that compressed gas is fed through carboneous porous ducts thereby to produce bubbles in the liquid mixture, the most suitable blowing-in pressure of air is in the range of 70 to 90 mm. Hg, as seen from the test results given in Table II, though it is dependent on the size of bubbles, the amount of gas, and gas pressure to be used. In the present embodiment of the invention using air, it is necessary to regulate the air pressure by the pressure regulation valve so that the air pressure in the air source should be always higher by 70 to 90 mm. Hg than the atmospheric pressure. If the blowing-in pressure exceeds the above range, the flow of oily water will be disturbed, and if below the above range, development of air bubbles will become inactive with a consequent drop in the separating effect.

TABLE II

| Pore size of porous duct | Blow-off area (m.²) | Blow-off pressure (mm. Hg) | Amount of air flow (into sea water) (m.³/h.) | Dia. of air bubble ($\mu$) |
|---|---|---|---|---|
| 30$\mu$ | 87×10⁻⁵ | 50 | None | |
| 30$\mu$ | 87×10⁻⁵ | 60 | 0.2 | |
| 30$\mu$ | 87×10⁻⁵ | 70 | 0.236 | 0.19 |
| 30$\mu$ | 87×10⁻⁵ | 80 | 0.315 | |
| 30$\mu$ | 87×10⁻⁵ | 90 | 0.37 | |

Besides, bubble size of gas has a material influence upon the separating efficiency. Namely, whether air bubbles are large or small influences, to a considerable extent, the degree of contact of the bubbles with oil particles, the surfacing velocity of bubbles, and the flow of oily water. For this reason, air bubbles are desired to be as small as possible. Too small bubbles, are of no use, however, because they will not stick to oil particles in the separating passage and will not come off and surface out of the oily water. If conversely the bubbles are too large, the flow of oily water tends to be disturbed, and the chances of contact with oil particles are decreased, again effecting the separating operation adversely. Therefore, the most desirable air bubble size which will not cause such difficulties as aforementioned is approximately 0.2 mm. in diameter when the flow rate of oily water is less than 0.1 m./sec., as seen from the test results shown in Table III.

TABLE III

| Test No. | Air bubble size (mm.) | Oily water conc. at inlet of separating passage (p.p.m.) | Oily water conc. at inlet of separating passage (p.p.m.) |
|---|---|---|---|
| 1 | Non-air | 10,000 | 82 |
| 2 | 0.19 | 10,000 | 54 |
| 3 | 0.08 | 10,000 | 75 |
| 4 | 0.65 | 10,000 | 60 |
| 5 | 1.13 | 10,000 | 90 |

Thus, the bubbles of air blown into the inlet of separating passage 4 carry heavy oil stuck thereto and are caught by the separating weirs 6 inside the passage and then are led through the discharge risers 7 into the inner cylinder 2. Also, the minute air bubbles blown out of the porous ducts 14 grow in size inside the vertical passage 4 until they flow together with separated heavy oil into the inner cylinder 2. As this increases the pressure inside the inner cylinder 2, the automatic pressure regulating valve 13 discharges the air automatically and regulates the pressure inside the inner cylinder 2 to a suitable value. As above described, slow and gradual introduction of air enhances the separation efficiency and permits almost complete separation.

In the apparatus embodying the invention, a drain means is provided which opens in the lower portion of the inner cylinder 2 for draining sea water of high specific gravity which has been branched into the inner cylinder and further separated therein and another drain means is provided which opens in the portion of the inner cylinder 2 above the former means and which serves to discharge heavy oil of low specific gravity, whereby the liquid once separated in the vertical passage is further separated in the inner cylinder almost completely, and taken out of the apparatus by taking advantage of the difference in specific gravity, without resorting to any special means.

The all-round test results on the separating efficiency achieved by the embodiment of the invention are given in Tables IV and V. The tests were conducted with oily water having an oil concentration of 10,000 mg./l. in the outlet of a single-stage centrifugal pump, or in the inlet of the apparatus, at a temperature of 16° C. Table IV gives the results of tests performed with samples of oily water which ordinarily could not be separated completely unless they are allowed to stand for more than 30 minutes. Table V gives the results of tests with samples of oily water natural separation of each of which required a period of more than one hour.

TABLE IV

| Test No. | Type of oily water | Oil conc. in the inlet (mg./l.) | Oil conc. in the outlet (mg./l.) | Aeration |
|---|---|---|---|---|
| 1 | Heavy oil, fresh water. | 10,000 | 36 | No. |
| 2 | do | 10,000 | 40 | No. |
| 3 | Heavy oil, sea water | 10,000 | 20 | No. |
| 4 | do | 10,000 | 15 | No. |
| 5 | do | 10,000 | 9 | Yes. |

TABLE V

| Test No. | Type of oily water | Oil conc. in the inlet (mg./l.) | Oil conc. in the outlet (mg./l.) | Aeration |
|---|---|---|---|---|
| 1 | Heavy oil, fresh water. | 10,000 | 94 | No. |
| 2 | Heavy oil, sea water | 10,000 | 82 | No. |
| 3 | do | 10,000 | 54 | Yes. |

From the test results tabled above, it will be clear that the apparatus for separating liquid mixtures in accordance with the invention is capable of attaining a very great separating effect in large-volume disposal of liquid mixtures, for example, oily water having relatively great oil concentrations.

As can also be seen from the foregoing tables, the separating effect is all the more enhanced by blowing of insoluble gas in the form of bubbles into the liquid being separated.

In the apparatus of the invention, the separating effect attainable by the flow-regulating plate provided in the separating passage is noteworthy, aside from the effect of gravitational separation which takes advantage of the difference in specific gravity of the constituents and from the additional effect of separation enabled by blowing in of insoluble gas. While only one flow-regulating plate 5 is adopted in the specific embodiment above illustrated, it is advisable to use a plurality of such plates because the increase in the number will make the flow of oily water laminar and bring increased chances of contact between the oily content and the regulation plates, with the result that the flocculation of oil particles is promoted and hence the separating effect is thereby improved.

Assuming the overall surface areas of flow-regulating plates provided in different numbers of one, three, and five, be $S_1$, $S_3$, and $S_5$, respectively, then a relation $S_1 < S_3 < S_5$ will hold. If the quantity of oily water to be treated is Q, the contact velocities of the oily water specimens will then be formulated as $Q/S_1 < Q/S_2 < Q/S_5$. The tests results are given in FIGS. 8 and 9.

Figure 8:
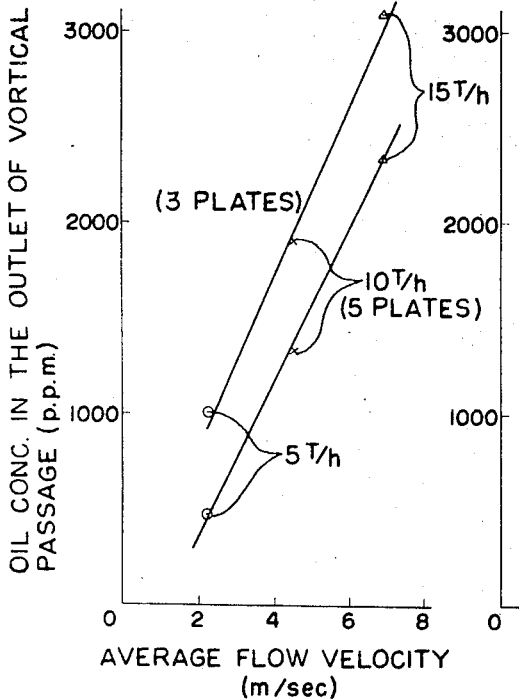
FIG. 8 is a diagram showing change in oil concentration by change in number of the flow-regulating plates.
Figure 9:
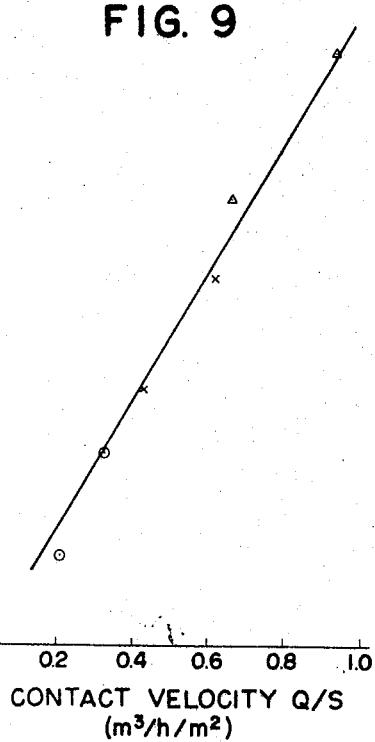
FIG. 9 is a diagram showing effects of the flow-regulating plates.

As will be understood from FIGS. 8 and 9, the effect of oily water separation is dependent upon the contact velocity $Q/S$ of the mixture, and it is improved with the decrease of $Q/S$. For this purpose, it is merely necessary to increase the number of flow-regulating plates. Although the vertical passage plate is used in the present embodiment of the invention to define a vertical passage between the inner and outer cylinders, it is alternatively possible to omit the vertical passage plate and allow a liquid mixture to whirl up or down in the tangential direction with respect to the surrounding walls of the inner cylinder. Also, while the vertical flow is caused in the form of a spiral flow, it is not always necessary to be spiral but may take any other suitable form.

Because, according to the present invention, as described hereinbefore, a vertical passage is formed for the flow of liquid mixture in a separating chamber defined between an outer cylinder and an inner cylinder, and provided with one or more of flow-regulating plates while said passage communicates with the inside of the inner cylinder through separating weirs, a liquid mixture whose constituents differ in specific gravity and are insoluble to each other is led into the vertical passage through an intake, and, in the course of upward vertical flow along the relatively long passage, the constituents of lighter specific gravity surface, and at least one portion of the separated constituents is effectively diverged from the vertically ascending passage, as if it were scraped off by the separating weirs connecting said passage with the inside of the inner cylinder, and then is separated out in the inner cylinder through the discharge pipes. Further, as the apparatus according to the invention which has the vertical passage for the flow of liquid mixture in the separating chamber defined between the inner and outer cylinders is equipped, in addition to the plurality of flow-regulating plates in the vertical passage, with an inlet port for insoluble gas bubbles in the vicinity of the port for feeding the liquid mixture into the vertical passage, while the vertical passage communicates with the inside of the inner cylinder through the separating weirs, the insoluble gas blown in through said inlet port permits a certain constituent of the liquid mixture to be entrained and come up on the surface, making it possible to separate those mixtures which are usually almost inseparable. Thus, notwithstanding the relatively simple construction, the apparatus according to the invention has an excellent performance in separation of liquid mixtures, and is very useful in the industrial applications to plants and marine vessels and so on, where large amounts of highly concentrated oily water must be disposed of to recover the oily contents and to drain the separated, clean water into rivers and ports. Moreover, the apparatus is capable of being used in separation of not only oily water but also of other liquid mixtures in which the constituents are incompatible or insoluble with one another, and hence can make a substantial contribution to the industrial economy and environment sanitation.

While specific embodiments of the invention have been shown and described in detail to illustrate the application of the inventive principles, it will be understood that the invention may be embodied otherwise without departing from such principles.

What is claimed is:

1. A device for separating two liquids of different specific gravity which are insoluble with respect to each other, including;
    an outer container,
    an inner container extending vertically and upwardly through the center portion of said outer container defining a liquid flow path between said inner and said outer container,
    means for introducing the liquid for separation into the lower extremity of the liquid flow path,
    a plurality of openings on the exterior wall of said inner container,
    first liquid separating means for directing the liquid to be separated upwardly along the liquid flow path in such a manner that the liquid of lesser specific gravity is directed closer to the exterior wall of said inner container,
    means for deflecting some of said portion of the liquid of lesser specific gravity adjacent the exterior wall of said inner container through said openings and into said inner container,
    means for discharging the liquid of greater specific gravity from said flow path,
    second liquid separating means inside the inner container to further separate liquid of a still lesser specific gravity from the liquid of a greater specific gravity contained within the inner container,
    first discharge means for discharging said further separated liquid of a lesser specific gravity from said inner container, and
    second discharge means for discharging the said further separated liquid of greater specific gravity from said inner container.

2. A device as defined in claim 1 wherein said first liquid separating means includes flow means to direct liquid introduced into the liquid flow path upwardly and tangentially with respect to said exterior wall of said inner container, said second separating means including automatic control means to sense the said further liquid separating by specific gravity in said inner container resulting from gravity.

3. A device as defined in claim 2 wherein said flow means includes vertically ascending passage plates extending along the flow path between said inner and said outer container to divide a helical rising passage for the liquid to be separated and at least one vertical flow regulating plate at right angles to said passage plates to further divide the helical rising passage and longitudinal to the flow of the liquid.

4. A device as defined in claim 3 wherein said flow plate is positioned at a height less than the height of said flow passage and a plurality of openings in the upper extremity of said flow plate permitting the liquid of lesser specific gravity to flow in a direction through said openings towards the exterior wall of said inner container.

5. A device as defined in claim 4 wherein said deflecting means includes a weir curved against the direction of liquid flow and mounted on the exterior wall of said inner container to direct the liquid of lesser specific gravity adjacent the exterior surface of said inner container, a vertical riser pipe located within said inner container and connected with said openings in said exterior wall of said inner container, means for discharging the liquid collected from said riser pipe into said inner container at the upper extremity thereof.

6. A device as defined in claim 5 including valve means in said riser for regulating the amount of discharge of liquid into said inner container.

7. A device as defined in claim 6 including inspection viewing means at the upper end of said inner container to view the nature of the liquid being discharged into said inner container.

8. A device as defined in claim 2 wherein said automatic control means includes a liquid detecting terminal to sense the difference in the specific gravity of the liquids separated by gravity in said inner container, and a discharge pipe extending upwardly into said inner container and connected to said first discharge means.

9. A device as defined in claim 8 including means for introducing an inert gas under pressure into the liquid being separated in the lower extremity of said liquid flow path.

10. A device as defined in claim 9 wherein said liquid introducing means includes an inlet pipe, inert gas introducing means including a plurality of porous ducts in said pipe, a gas reservoir containing inert gas to regulate pressure and a regulating valve controlling the flow of gas to said ducts.

11. A device as defined in claim 10 including an automatic pressure regulating valve to maintain the pressure of the inert gas suitable in the liquid as the liquid passes along the flow passage.

12. A device is defined in claim 1 wherein the rate of flow of the liquid to be separated in said flow passage is maintained at a rate of 0.1 m./sec. or less.

13. A device as defined in claim 1 wherein the amount of liquid introduced through said liquid introducing means is in the range of between 10 to 45 tons per hour, the inner cylinder is 900 mm. in diameter and 2,700 mm. in height, the outer cylinder is 1,800 mm. in diameter and 2,700 mm. in height, the flow passage is 450 mm. in width and 350 mm. in height in cross section and 12,000 mm. in length.

14. A device as defined in claim 1 wherein the compressed gas is introduced at a pressure in the range of between 70 to 90 mm. Hg above atmospheric and the bubbles resulting are 0.2 mm. in diameter.

References Cited

UNITED STATES PATENTS

| | | | |
|---|---|---|---|
| 2,257,244 | 9/1941 | Oehler | 210—187 X |
| 2,355,875 | 8/1944 | Lasseter | 210—522 X |
| 2,595,602 | 5/1952 | Parks | 55—178 X |
| 2,730,190 | 1/1956 | Brown et al. | 55—45 X |
| 3,199,681 | 8/1965 | Kirkpatrick | 210—94 X |

REUBEN FRIEDMAN, *Primary Examiner.*

T. A. GRANGER, *Assistant Examiner.*

U.S. Cl. X.R.

209—170; 210—304